United States Patent
Lockhart et al.

(10) Patent No.: US 9,749,588 B2
(45) Date of Patent: *Aug. 29, 2017

(54) FACILITATING MULTI-PARTY CONFERENCES, INCLUDING ALLOCATING RESOURCES NEEDED FOR CONFERENCE WHILE ESTABLISHING CONNECTIONS WITH PARTICIPANTS

(71) Applicant: Polycom, Inc., San Jose, CA (US)

(72) Inventors: Carin Lockhart, Littleton, CO (US); Kuldeep Pandey, Longmont, CO (US); Piotr Drozdzewicz, Broomfield, CO (US); Jeff Adams, Lafayette, CO (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,231

(22) Filed: Mar. 16, 2016

(65) Prior Publication Data

US 2016/0198124 A1    Jul. 7, 2016

Related U.S. Application Data

(63) Continuation of application No. 13/945,570, filed on Jul. 18, 2013, now Pat. No. 9,319,634.

(60) Provisional application No. 61/673,044, filed on Jul. 18, 2012.

(51) Int. Cl.
| | |
|---|---|
| *H04N 7/15* | (2006.01) |
| *H04L 29/06* | (2006.01) |
| *H04L 12/18* | (2006.01) |
| *H04N 7/14* | (2006.01) |

(52) U.S. Cl.
CPC .......... *H04N 7/152* (2013.01); *H04L 12/1818* (2013.01); *H04L 65/1069* (2013.01); *H04L 65/1093* (2013.01); *H04L 65/403* (2013.01); *H04N 7/147* (2013.01)

(58) Field of Classification Search
CPC ...................................................... H04N 7/152
USPC ..................... 348/14.09; 370/252, 260, 261; 379/202.01; 455/416, 414.1
See application file for complete search history.

(56) References Cited

U.S. PATENT DOCUMENTS

| | | |
|---|---|---|
| 5,199,029 A | 3/1993 | Hessler |
| 6,665,392 B1 | 12/2003 | Wellner et al. |
| 6,798,753 B1 | 9/2004 | Doganata et al. |
| 7,007,098 B1 | 2/2006 | Smyth et al. |
| 7,085,243 B2 | 8/2006 | Decker |
| 7,174,365 B1 | 2/2007 | Even |
| 7,362,349 B2 | 4/2008 | Nelson et al. |
| 7,593,032 B2 | 9/2009 | Civanlar et al. |

(Continued)

*Primary Examiner* — Gerald Gauthier
(74) *Attorney, Agent, or Firm* — Blank Rome, LLP (57) ABSTRACT

A system includes a network interface for sending and receiving one or more of video data and audio data between two or more endpoints. One or more of a video data source and an audio data source located at more than one endpoint and a control unit for controlling one or more of the video data and the audio data between endpoints. The control unit is operable to execute instructions to specify more than one participant in a conference, wherein at least one participant is remotely located and invoke the conference upon receiving one or more requests to connect to the conference by one or more participants. The control unit is further operable to allocate resources upon the conference being invoked and connect participants to the conference.

20 Claims, 4 Drawing Sheets

(56) References Cited

U.S. PATENT DOCUMENTS

| | | | |
|---|---|---|---|
| 7,617,280 B1 | 11/2009 | Webster et al. | |
| 7,664,058 B1* | 2/2010 | Hanson | H04L 12/1818 370/260 |
| 7,680,897 B1 | 3/2010 | Carter et al. | |
| 7,830,824 B2 | 11/2010 | Decker | |
| 8,462,931 B2 | 6/2013 | Moore | |
| 9,131,051 B2 | 9/2015 | Lederer | |
| 9,264,549 B1* | 2/2016 | Gass | H04M 3/565 |
| 9,319,634 B2* | 4/2016 | Lockhart | H04N 7/152 |
| 2002/0159394 A1* | 10/2002 | Decker | H04L 12/1818 370/252 |
| 2004/0037407 A1* | 2/2004 | Gourraud | H04L 29/06027 379/202.01 |
| 2005/0058088 A1* | 3/2005 | Decker | H04L 12/1818 370/260 |
| 2005/0130638 A1* | 6/2005 | Schrader | H04M 7/006 455/416 |
| 2005/0174951 A1* | 8/2005 | Schrader | H04N 7/152 370/260 |
| 2005/0259145 A1* | 11/2005 | Schrader | H04N 7/152 348/14.09 |
| 2006/0088152 A1* | 4/2006 | Green | H04M 3/56 379/202.01 |
| 2006/0245566 A1* | 11/2006 | Parker | H04M 3/56 379/202.01 |
| 2006/0291637 A1* | 12/2006 | Erickson | H04M 3/2218 379/202.01 |
| 2007/0172044 A1* | 7/2007 | Nguyen | H04L 12/1818 379/202.01 |
| 2008/0037447 A1* | 2/2008 | Garg | H04L 29/06027 370/260 |
| 2008/0181140 A1 | 7/2008 | Bangor et al. | |
| 2008/0239994 A1 | 10/2008 | Xiong et al. | |
| 2009/0040948 A1 | 2/2009 | Wengrovitz et al. | |
| 2009/0149167 A1* | 6/2009 | Patel | H04W 76/002 455/416 |
| 2009/0209242 A1* | 8/2009 | Chin | H04M 3/38 455/416 |
| 2010/0189244 A1* | 7/2010 | Sastry | H04M 3/56 379/202.01 |
| 2010/0322113 A1* | 12/2010 | Chin | H04M 3/38 370/261 |
| 2011/0279634 A1 | 11/2011 | Periyannan et al. | |
| 2012/0246229 A1 | 9/2012 | Carr et al. | |
| 2013/0147903 A1 | 6/2013 | Weiser et al. | |
| 2013/0151623 A1 | 6/2013 | Weiser et al. | |
| 2013/0335515 A1 | 12/2013 | Wamorkar et al. | |
| 2014/0022334 A1* | 1/2014 | Lockhart | H04N 7/152 348/14.09 |

* cited by examiner

FACILITATING MULTI-PARTY CONFERENCES, INCLUDING ALLOCATING RESOURCES NEEDED FOR CONFERENCE WHILE ESTABLISHING CONNECTIONS WITH PARTICIPANTS

CROSS REFERENCE TO RELATED APPLICATIONS

This application is a continuation of U.S. application Ser. No. 13/945,570 filed Jul. 18, 2013, which claims priority to U.S. Provisional Application Ser. No. 61/673,044, filed Jul. 18, 2012, both of which are incorporated by reference in their entirety herein.

BACKGROUND

The present disclosure relates generally to videoconferencing systems, and more particularly, to facilitating multi-party conferences, including dynamically allocating the resources needed for the conference, while establishing connections with participants.

Audio and/or video conferencing technology has developed to the point that it has become, in many cases, a useful substitute for conducting group meetings in a variety of environments. Audio and/or video conferencing entails the exchange of audio, video, and other information between at least two participants that are generally remotely located to one another. An endpoint is provided at each participant location to enable the participants to see or hear each other, or both. The endpoint may include a microphone for capturing audio signals from local participants and a speaker for converting audio signals received from the remote participants into sound. The endpoint may optionally include a camera for capturing video of local participants and a display device for displaying video of remote participants. The endpoint may also include display devices for displaying digital content. Where more than two endpoints participate in a conferencing session, a multipoint control unit (MCU) may be used to control the conference. The MCU may receive audio, video, and data from one or more endpoints, and then transmit the audio, video, and data to the appropriate endpoints, via a network.

Historically, these multi-party conferences, whether audio or video, or both, have taken one of two forms: scheduled or ad hoc. Typically when scheduling a conference, a start time and an end time are provided. The number of conference participants is often provided, and optionally, the identities of the participants may be provided. Participants may be provided with contact information, such as a telephone number or web address (URL), so that they may contact and join the conference. Depending upon the subject matter of the conference, participants may be given and/or need to provide appropriate credentials and passcode to authenticate their identity to gain access to the conference.

When the conference is scheduled, it may be determined if participants are to contact the conference, known in the art as "dial-in," or await to be contacted by an organizer, or organizers, of the conference known as "dial-out." Also resources required to effectuate the conference are often reserved at the time the conference is scheduled. These resources may include MCUs, conference bridges, dial-out telecommunication lines, and other known resources. Additionally, if the scheduled conference is going to be a recurring conference, recurrence information can be provided at the time the conference is scheduled.

As compared to scheduled conferences, ad hoc conferences, known in the art as "reservationless" conferences, may occur at any time. In reservationless conferences, the number of conference participants and their identities is typically not provided and whether the participant is a dial-in or dial-out participant, may be specified for each participant. However, participants in reservationless conferences are typically provided with persistent contact information, such as a telephone number or web address (URL), so that they may contact and join the conference at any given time. Depending upon the subject matter of the conference, participants may be given and/or need to provide appropriate credentials and passcode to authenticate their identity to gain access to the conference.

Contrary to scheduled conferences, the resources required to effectuate a reservationless conference are not reserved, since the conference is not scheduled. Thus, some participants may not be able to join the reservationless conference, since available resources may be exhausted. Optionally, it is sometimes possible to allocate resources as individual participants connect to the reservationless conference.

Frequently, it would be convenient to have a dial-out conference on a short notice. Neither type of traditional conference handles this situation well. Ad hoc conferences do not support automatic dial-out, although some may support a user portal allowing a manual dial-out. Such a portal is useful, provided that the conference initiator and/or chairperson has access to such a portal when they need to have the conference. Often, this is not the case. Alternatively, scheduled conferences do provide automatic dial-out, but they do not permit efficient unscheduled use. Thus, what is needed is a new conference type.

SUMMARY

In one general embodiment, a method comprises specifying more than one participant in a conference, where at least one participant is located remotely. The method continues with invoking the conference upon connecting one or more participants to the conference, and allocating resources upon the conference being invoked to connect participants to the conference.

In another general embodiment, a system includes a network interface for sending and receiving one or more of video data and audio data between two or more endpoints, one or more of a video data source and an audio data source located at more than one endpoint, and a control unit. The control unit controls one or more of the video data and the audio data between endpoints. The control unit is operable to execute instructions to specify more than one participant in a conference, wherein at least one participant is remotely located and invoke the conference upon receiving one or more requests to connect to the conference by one or more participants. The control unit is further operable to allocate resources upon the conference being invoked and connect participants to the conference.

In further general embodiment, a method that comprises specifying more than one participant in a conference, where at least one participant is located remotely. The method continues with designating at least one participant as chairperson, invoking the conference upon receiving a request to connect to the conference by the chairperson, and allocating resources upon the conference being invoked to connect participants to the conference.

In another general embodiment, a non-transitory computer-readable medium comprises instructions to cause one or more processors to specify more than one participant in a conference where at least one participant is located remotely and designate at least one participant as chairperson, receive a request to connect to the conference by more than one participant, and determine if the chairperson has requested to connect to the conference. The computer-readable further medium comprises instructions to invoke the conference upon receiving the request to connect to the conference from the chairperson, allocate resources upon the conference being invoked, and request participants to connect to the conference.

DETAILED DESCRIPTION

The following description is made for the purpose of general illustration and is not meant to limit the inventive concepts claimed herein. Further, particular features described herein can be used in combination with other described features in each of the various possible combinations and permutations.

Figure 1:
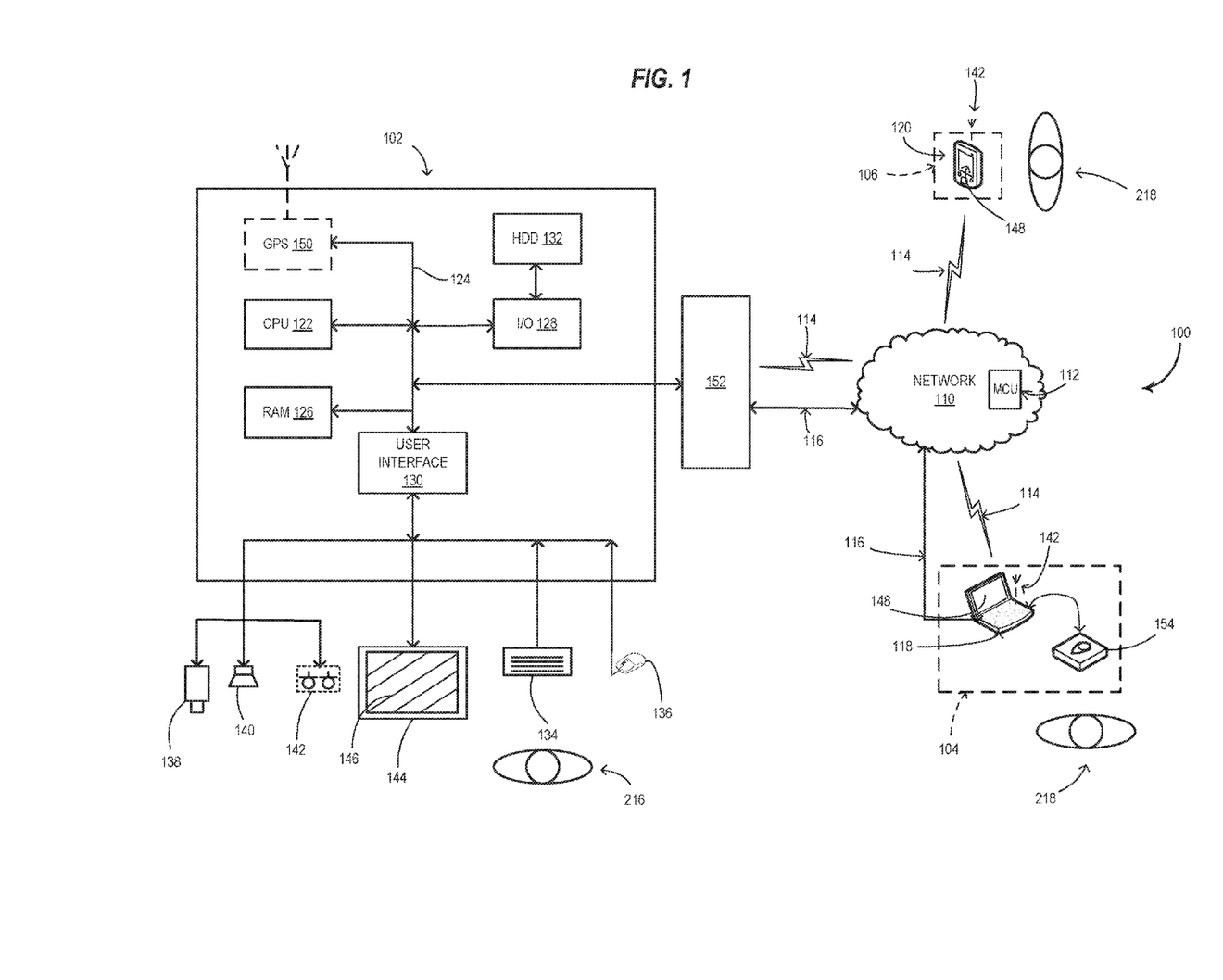
FIG. 1 illustrates a simplified block diagram of an embodiment of a system for facilitating multi-party conferences, including allocating the resources needed for the conference, while establishing connections with participants.

As illustrated in FIG. 1, there is shown generally at 100, an embodiment of a system that facilitates multi-party conferences and dynamically allocates the resources needed for the conference, while establishing connections with participants. In a general embodiment, the system 100 includes more than one endpoint 102, 104, 106, and may include a plurality of endpoints. The endpoints 102-106 may communicate over one or more networks 110 (only one is shown for ease of discussion only). A multipoint control unit (MCU) 112 may be provided for controlling communications between the endpoints 102-106 over the network 110. In some embodiments, there may be more than one MCU 112 in the system 100. For example, an MCU 112 may be embodied in one or more endpoints 102-106.

In the embodiments, the network 110 may take any form including, but not limited to, a local area network (LAN), a wireless network, or a wide area network (WAN) such as the Internet, peer-to-peer network, etc. The endpoints 102-106 may be connected to the network 110 either wired 116 or wirelessly 114. Additionally, the network 110 may comprise both LAN and WAN networks, where the WAN provides connectivity between remotely located LAN networks 110. Network communication between the endpoints 102-106 may be based on known communication protocols and compression standards.

An exemplary endpoint of the system 100 is shown at 102 in FIG. 1. It is to be understood that the exemplary endpoint 102 may comprise any endpoint 102-106 within the system 100, and may comprise more than one endpoint 102-106. An endpoint 102-106 may comprise any suitable device that facilitates communication between remote parties. Exemplary endpoints 102-106 may include, but are not limited to, conference phones that facilitate audio communication between remotely located participants; videoconference endpoints that facilitate simultaneous two-way video and audio transmissions between remotely located participants; a desktop computer configured with at least a speaker and a microphone and capable of audio communications; and portable computing devices. These portable computing devices may include laptop computers 118, smartphones 120 and other mobile telephones, tablet computers and other portable computing devices (not shown), any of which are at least capable of telecommunication, and optionally, additionally capable of video data communications.

In the embodiments, the exemplary endpoint 102 may include a central processing unit (CPU) 122, such as a microprocessor, and a number of other components interconnected via a system bus 124. The CPU 122 is capable of operating and running an operating system. In some embodiments, the CPU 122 may run a graphical interface operating system, such as Windows®, by Microsoft Corporation, of Redmond, Wash. In some embodiments, the endpoint 102 may include a Random Access Memory (RAM) 126, an I/O adapter 128, and a user interface adapter 130. The I/O adapter 128 may be provided for connecting peripheral devices, such as a disk storage unit 132 to the bus 124. The user interface adapter 130 may be provided for connecting user interface devices such as a keyboard 134, mouse 136, camera 138, speaker 140, and microphone 142, to the bus 124. Optionally, the camera 138 may comprise a pan-tilt-zoom (PZT) camera, with the orientation, positioning and repositioning, and settings thereof controlled by the processor 122 and/or user via the user interface 130.

In optional embodiments, for example if an endpoint 102-106 comprises a portable computing device such as a laptop computer 118, smartphone 120, tablet computer or other portable computing device, the endpoint 102-106 may include a Global Positioning System (GPS) device 142. The GPS device 142 may be enabled to determine the location of the endpoint 102-106, and thus the participant.

The endpoint 102 may additionally include visual means, such as one or more display monitors 144 coupled to the bus 124. The monitor 144 may provide video data, status indications, and other data to a user. The processor 122 receives data from the user, and optionally the MCU 112, and processes the data for controlling the endpoint 102. In some embodiments, a screen 146 of the monitor 104, or a display screen 148 of a laptop 118 or smartphone 120, may comprise a touchscreen. A user may move a pointer 150 (shown in FIG. 2) about the screen 146, 148 using their fingers as known to control elements displayed on the screen 146, 148.

Figure 2:
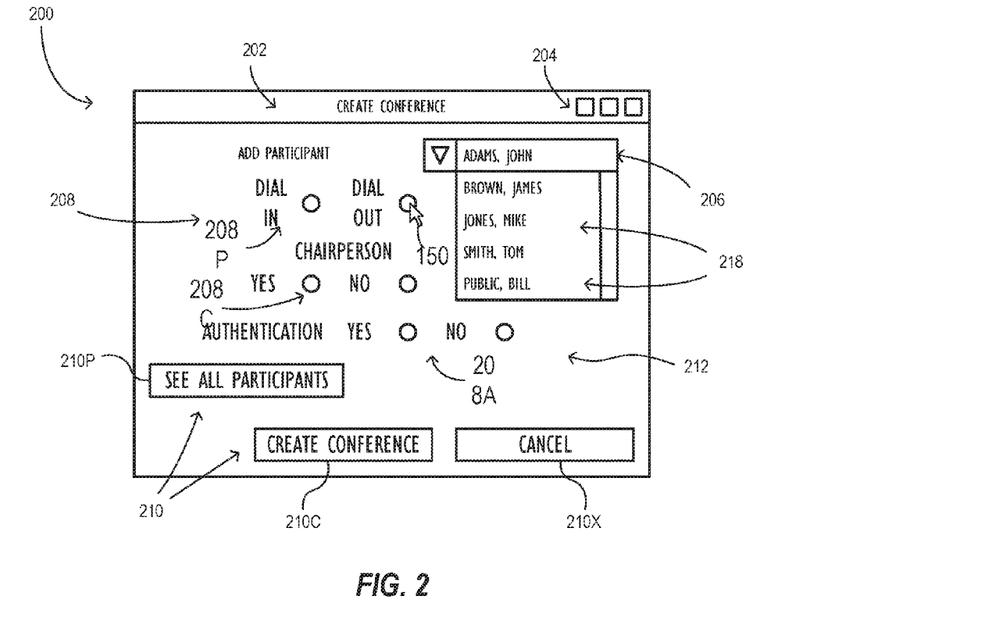
FIG. 2 illustrates an embodiment of an exemplary user interface.
Figure 3:
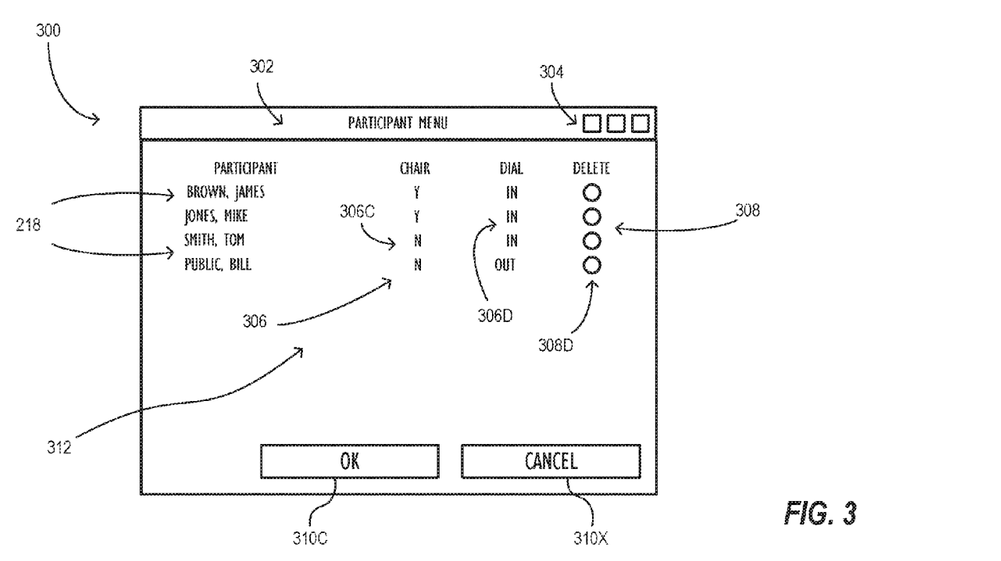
FIG. 3 illustrates another embodiment of an exemplary user interface.

An exemplary graphical user interface, for establishing and facilitating multi-party conferences, and allocating the resources needed for the conference, while establishing connections with participants is illustrated in FIG. 2 and FIG. 3. A "Create Conference" window is shown generally at 200 in FIG. 2. In some embodiments, the Create Conference window 200 may comprise a two dimensional graphical user interface window that is arranged on a desktop of a graphical interface operating system, such as Windows®. The Create Conference window 200 may be opened by a mouse-click action on an icon representing the Create Conference window 200 on a desktop of a graphical interface operating system (both not shown), as known in the art. The Create Conference window 200 may be displayed on one or more endpoints 102-106 and may be opened, closed, sized, moved, hidden, and restored, as is known in the art. The create conference window 200, may include a number of graphical objects for establishing, facilitating, and terminating multi-party conferences. These graphical objects may include, but are not limited to, a menu bar 202, one or more toolbars 204 that may be located in or near the menu bar 202, one or more menus 206 that may comprise a pull-down or drop-down menu, and other graphical user interface elements. Some of these graphical user interface elements may include "option" buttons, referred to in the art as "radio" buttons, shown generally at 208, control tabs 210, and other graphical user interface elements, all of which may be located in a working area, shown generally at 212.

The elements of the Create Conference window 200 may be controlled, invoked, activated, or otherwise controlled by means of the pointer 150. The pointer 150 may be controlled by a pointer device, the mouse 136. Optionally, if the monitor 104 is configured with a touchscreen 146, 148, the user can move the pointer 150 and select the radio buttons 208, control tabs 210, and other elements of the Create Conference window 200 via the touchscreen 146, 148.

In the embodiment shown in FIG. 2, the Create Conference window 200 includes a "Create Conference" menu bar 202, an "Add Participant" drop-down menu 206, a "See All Participants" tab 210P, a "Create Conference" tab 210C, and "Cancel" tab 210X. Radio buttons 208 in the embodiment include "Authentication" buttons 208A, "Chairperson" buttons 208C, and "Add Participant" buttons 208P. A user 216, or other entity, which establishes a conference is referred to in the art as "host." Hereinafter, "host" and "user" may be used interchangeably to refer to an individual, group, business entity, or any other entity which initiated establishing a conference. Additionally, any endpoint 102-106 where the host or user 216 is located is referred to herein as a "host endpoint". Thus in the embodiments shown, endpoint 102 will comprise the host endpoint as discussed hereinafter. Further, as referred to hereinafter, "participant" may be used interchangeably with "endpoint." Typically one or more participants 218 may be located at and/or operating any given endpoint 102-106. Thus a participant 218 listed in the drop-down menu 206 may comprise an individual, more than one individual, or group of individuals, or any other entity which are located at and/or operate any one endpoint 102-106, and which do not establish a conference.

The radio buttons 208 allow the host 216 to select participants 218, shown in FIG. 1, and then designate a chairperson from the selected participants 218. The radio buttons 208 also allow the host 216, or system 100, to determine other parameters for the selected participants 218. For example, the host 216, or system 100, may determine how the selected participants 218 are going to connect to the conference using dial-in or dial-out radio buttons 208P, and if authentication is required, by selecting the appropriate authentication radio button 208A. Referring still to FIG. 2, the host 216 may select a single participant 218, more than one participant 218, or all participants 218 from the drop-down menu 206. The Create Conference window 200 additionally allows the user 216 to view all participants 218 of the conference, as well as cancel 210X. The cancel button 210X may be used to terminate cancellation of the creation of a conference, terminate an ongoing conference, or terminate a particular action.

The host 216 may open the Create Conference window 200 and select the create conference tab 210C to commence establishing a conference. The host 216 then opens the Add Participant drop-down menu 206, and selects one or more participants 218 from the menu 206. A number of parameters may be used when establishing the conference. For example, the system 100 may use location data, presence data, and other information, provided by the GPS device 142, to locate a potential participant 218. The location data and presence data may be used to determine which MCU 112, when the system 100 includes more than one MCU 112, that the potential participant 218 may connect to, for connecting to the conference.

Location data and presence data may be used together with profile information about the potential participant 218 to determine how to connect the participant 218 to the conference, such as via a dial-out or dial-in connection. For example, if the participant 218, and thus endpoint 104-106 is located in an office building, or similar location, a dial-out connection to the endpoint 104-106 may be preferred. Alternatively, if the participant 218 is traveling, or located where conferencing capabilities, such as audio conferencing and/or suitable videoconferencing capabilities are not available, they may connect to the conference via a dial-in connection, where the participant 218 connects to the conference with a mobile device such as the laptop 118 or smartphone 120, or other mobile device. Depending upon the location of the participant 218, as well as the capabilities of the laptop 118 or smartphone 120, the participant 218 may participate in the conference via audio, video, or both.

If the participant 218 is connecting to the host endpoint 102 to via a dial-in connection, the participant 218 may connect connecting to the host endpoint 102 using one or more networks 110. For example, if the participant 218 connect to the host endpoint 102 via a network 110, such as the Internet, via a network interface 152. They may connect to the network 110 either wirelessly 114 or wired connection 116. Alternatively, if the dial-out option is selected, remotely located participants 218 are contacted by the host 216 using one or more networks 110, as discussed.

Upon connecting the selected participants 218 to the host endpoint 102, the participants 218 may be requested to authenticate their identity to the host 216. For example, the host 216 may select the Authentication YES radio button 208A, and require that participants 218 authenticate their identity. One or more methods may be used by selected participants 218 or the host 216 to authenticate participants 218. Upon connecting to the host endpoint 102 a participant 218 may authenticate their identity by entering one or more passcodes. The passcodes may be used be used in combination with location data and presence data to authenticate the identity of an individual, or individuals, as well as endpoint 104-106. Optionally, a biometric scanner 154 may be used in combination with an individual's passcode to authenticate the identity of an individual.

It may be determined at any time whether the conference will have a chairperson. For example, upon authenticating the participants 218 selected for the conference, it may then be determined if the conference with have a chairperson. The Chairperson radio buttons 208C may be actuated, where selecting the "YES" button indicates that the conference will have a chairperson and selecting the "NO" button indicates that the conference will not have a chairperson. Optionally, the Chairperson radio buttons 208C may be actuated as participants 218 are selected for the conference, for designating a participant 218 as chairperson upon selecting the participant 218. In some embodiments, a first participant 218 that connects to the conference may be designated as chairperson. In another embodiment, the chairperson may be selected arbitrarily from participants 218 connected to the conference. The conference may commence upon the chairperson being connect to the conference and authenticating.

As illustrated in FIG. 3, the system 100 additionally includes a "Participant Menu" window shown generally at 300. In some embodiments, the Participant Menu window 300 may comprise a two dimensional graphical user interface window, that is arranged on a desktop of a graphical interface operating system, such as Windows®, as discussed. The Participant Menu window 300 may be used to identify the participants 218 in a conference and provide other information. The Participant Menu window 300 may be displayed on one or more endpoints 102-106 and may include a number of exemplary graphical objects that may include, but are not limited to, a menu bar 302, one or more toolbars 304 that may be located in or near the menu bar 302, a number of lists 306, and radio buttons, shown generally at 308, control tabs 310, and other graphical user interface elements, all of which may be located in a working area, shown generally at 312.

In some embodiments, the Participant Menu window 300 may display information such as a "Chair" list 306C, that indicates whether the participant 218 is designated as a chairperson. The Participant Menu window 300 may also include a "Dial" list 306D, that indicates whether the participant 218 is a dial-in or dial-out participant 218. In optional embodiments, the Participant Menu window 300 may also include "Delete" radio buttons 308D, that allow the host 216 to remove one or more listed participants 218 from the conference.

Figure 4:
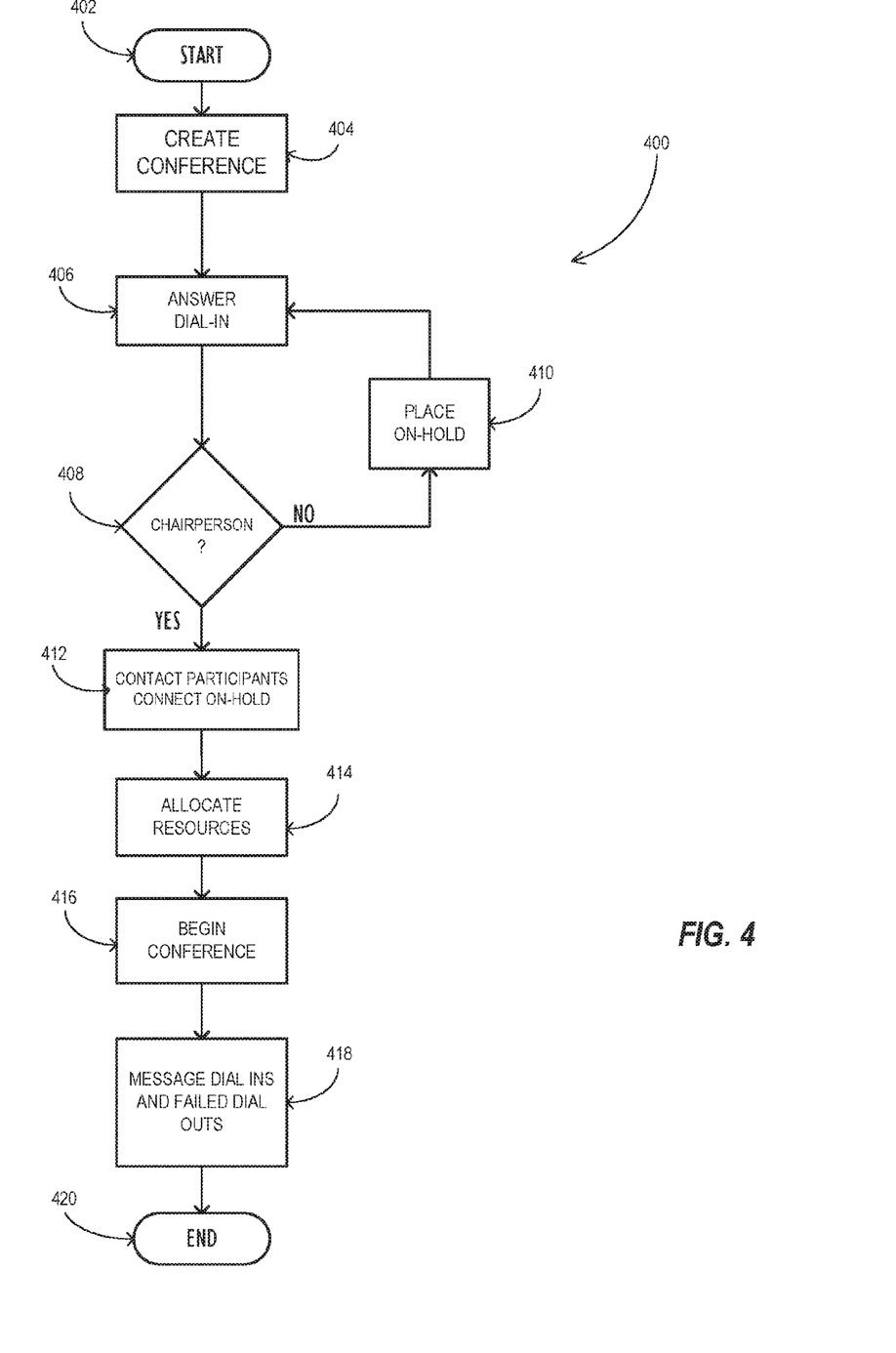
FIG. 4 is a flowchart showing an exemplary method for facilitating multi-party conferences.

An exemplary embodiment of a method for facilitating multi-party conferences and dynamically allocates the resources needed for the conference, while establishing connections with participants is shown generally at 400 in FIG. 4. As an option, the method 400 may be carried out in the context of the architecture and environment the Figures, and particularly to FIGS. 1-3 of the Figures. However, the method 400 may be carried out in any desired environment.

The method 400 commences in operation 402. In operation 404 it is determined to create a conference. In some embodiments, the Create Conference window 200 may be opened to commence creation of the conference, using the methods discussed. Once the Create Conference window 200 is opened, the conference may be created using one or more discussed methods. In one embodiment, the host 216 selects one or more participants 218 listed in the drop-down menu 206. As an option, the host 216 may use the radio buttons 208 to select whether authentication is required using the authentication radio button 208A, and for designating one or more participants 218 as chairperson, using the Chairperson radio buttons 208C. In some embodiments, the host 216 may determine how the selected participants 218 are going to connect to the conference using the dial-in or dial-out radio buttons 208P. In optional embodiments, the system 100, may determine how the selected participants 218 are going to connect to the conference. For example, the system 100 may use location data, presence data, and other information, provided by the GPS device 142, to locate the participant 218 and determine how to connect the participant 218 to the conference, such as via dial-out or dial-in connection.

In operation 406, in some embodiments, at any time after the conference is created selected participants 218, including the chairperson, may contact the conference. The system 100 receives these dial-ins and determines whether one or more participants 218 who've contacted the conference is designated as a chairperson. In operation 408, if at least one participant 218 designated as a chairperson has not contacted the conference, the conference is not invoked, and the one or more participants 218 is placed in a "delay-connection" state operation 410. The method 400 then returns to operation 406. The delay-connection state, of operation 410, is commonly referred to as a "hold," where a connection between the participant 218 and system 100 is not terminated, and the conference is not yet invoked. The participant 218 may be placed on hold until at least one participant 218 designated as a chairperson joins the conference.

In operation 408, if at least one participant 218 designated as a chairperson has contacted the conference, the method 400 continues to operation 412. In operation 412, in some embodiments, upon at least one participant 218 designated as a chairperson joining the conference, the system 100 may contact participants 218 for the purpose of connecting participants 218 to the conference. Where a participant 218 is designated as dial-out participant, the participant 218 is connected to the conference upon establishing a connection between the participant 218 and the conference.

Also in operation 412, in the embodiments, upon at least one participant 218 designated as a chairperson joining the conference, any on-hold dial-in participant 218 are connected to the conference. The method 400 then continues to operation 414, where resources are allocated as required by the system 100 to connect the participants 218 to the conference. Required conference resources may include, but are not limited to, one or more MCUs 112, one or more network interfaces 152, or bridges, to connect to one or more networks 110, telecommunication resources, and other resources common to conferencing. Thus, only resources required for the conference are allocated by the system 100, as opposed to scheduled conferences, where resources are allocated at the time the conference is scheduled, or ad hoc conferences, where resources are never allocated or are allocated as individual participants connect to the conference. In optional embodiments, the system 100 may allocate only resources to establish a connection with dial-out participants 218.

The method 400 then continues to operation 416 where the conference is begun. As the conference is on-going, other selected participants 218 that are designated as dial-in participants, may be requested to connect to the conference via any one of several different methods. In the embodiments, participants 218 that are designated as dial-in participants may be contacted by the system 100 telephonically, via electronic mail (e-mail), Short Message Service (SMS) messaging, commonly referred to as text messaging, or via social media. The system 100 may send messages to participants 218 that may notify the user to dial-in to the conference. Alternatively, the system 100 may notify participants 218 that an attempt to establish a dial-out connection with them was unsuccessful. If an attempt to establish a dial-out connection with them was unsuccessful, the notification may also provide dial-in information so the participant 218 may join the conference. Optionally, messages sent to participants 218 may include required authentication information, and other information. The method 400 terminates at operation 420.

Figure 5:
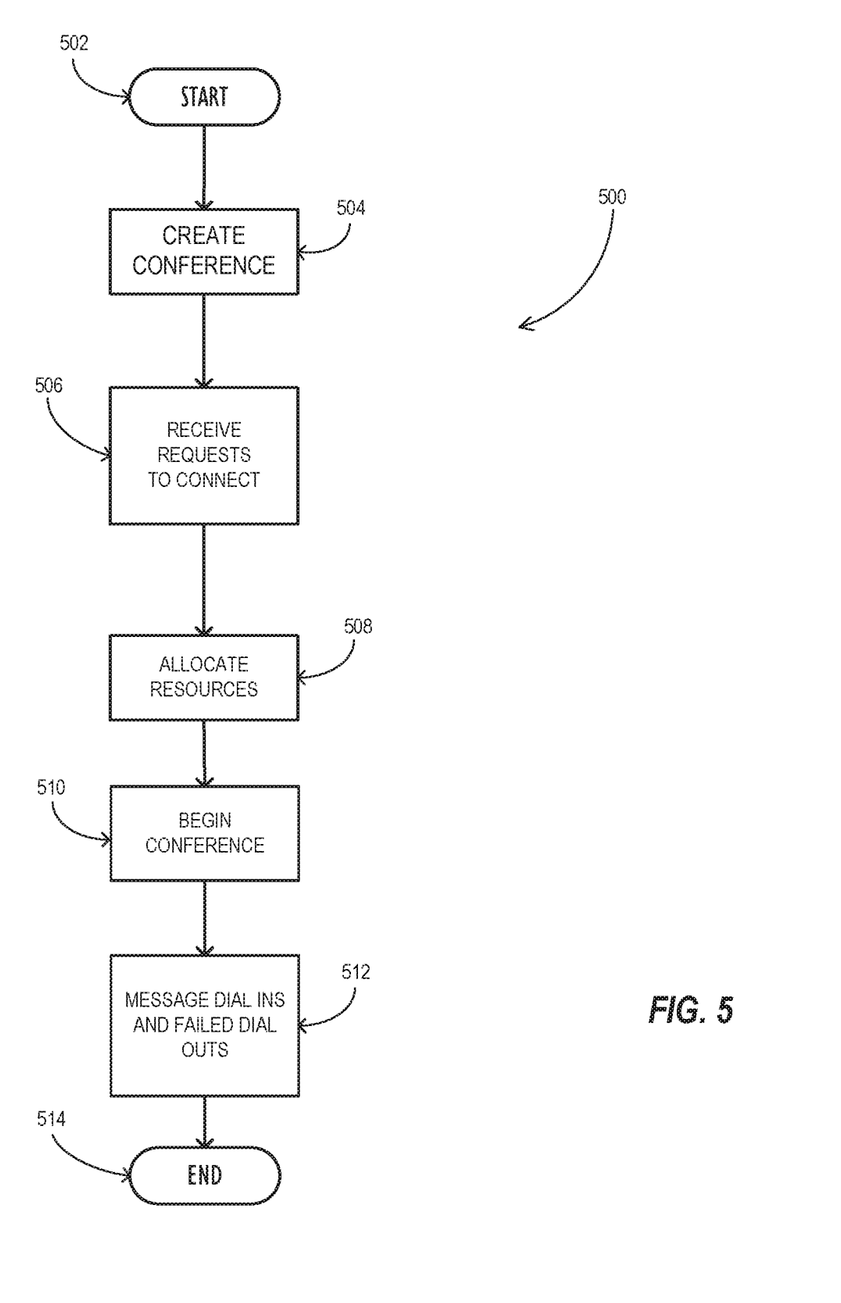
FIG. 5 is a flowchart showing an alternative exemplary method for facilitating multi-party conferences.

An alternative embodiment of a method for facilitating multi-party conferences and dynamically allocates the resources needed for the conference, while establishing connections with participants. is shown generally at 500 in FIG. 5. As an option, the method 500 may be carried out in the context of the architecture and environment the Figures, and particularly to FIGS. 1-3 of the Figures. However, the method 500 may be carried out in any desired environment.

The method 500 commences in operation 502. In operation 504 it is determined to create a conference. In some embodiments, the Create Conference window 200 may be opened to commence creation of the conference, using the methods previously discussed. Once the Create Conference window 200 is opened, the conference may be created using one or more discussed methods. In one embodiment, the host 216 selects one or more participants 218 listed in the drop-down menu 206. As an option, the host 216 may use the radio buttons 208 to select whether authentication is required using the authentication radio button 208A, and for designating one or more participants 218 as chairperson, using the Chairperson radio buttons 208C. In some embodiments, the host 216 may determine how the selected participants 218 are going to connect to the conference using the dial-in or dial-out radio buttons 208P. In optional embodiments, the system 100, may determine how the selected participants 218 are going to connect to the conference. For example, the system 100 may use location data, presence data, and other information, provided by the GPS device 142, to locate the participant 218 and determine how to connect the participant 218 to the conference, such as via dial-out or dial-in connection.

In operation 506, in some embodiments, at any time after the conference is created selected participants 218 may contact the conference and request to connect to the conference. In some embodiments, the system 100 receives these dial-ins and determines a first participant 218 which contacted the conference in operation 508. The first participant 218 that contacted the conference may be designated as chairperson, shown in operation 508. The method 500 then continues to operation 510 where resources required to connect the participants 218 to the conference are allocated by the system 100. The conference is begun in operation 512.

As the conference is on-going, other selected participants 218 may be contacted by the system 100 and requested to connect to the conference, in operation 514. These participants 218 may be requested to connect to the conference via one or more of the several different methods discussed. The method 500 terminates at operation 516.

As will be appreciated by one skilled in the art, aspects of the disclosure may be embodied as a system, method or non-transitory computer program product. Accordingly, aspects of the disclosure may take the form of an entirely hardware embodiment, an entirely software embodiment (including firmware, resident software, micro-code, etc.) or an embodiment combining non-transitory software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a non-transitory computer readable signal medium or a computer readable storage medium. A non-transitory computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Program code embodied on a non-transitory computer readable medium may be transmitted using any appropriate medium, including but not limited to wireless, wireline, optical fiber cable, RF, etc., or any suitable combination of the foregoing.

Non-transitory computer program code for carrying out operations for aspects of the disclosure may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A method comprising:
indicating whether each of a plurality of conference participants is a dial-in participant or a dial-out participant;
connecting a conference participant of the plurality of conference participants to a reservationless conference, comprising one of:
receiving a dial-in from the conference participant; and
establishing a dial-out with the conference participant; and
allocating resources for the reservationless conference upon connecting the conference participant to the reservationless conference; and
invoking the reservationless conference upon connecting the conference participant to the reservationless conference.

2. The method of claim 1, further comprising:
messaging dial-in participants to request the dial-in participants to connect to the reservationless conference.

3. The method of claim 2, further comprising:
messaging dial-out participants with at least one failed request to connect to the reservationless conference to request the dial-out participants to connect to the reservationless conference.

4. The method of claim 1,
identifying a chairperson for the reservationless conference.

5. The method of claim 4, wherein invoking the reservationless conference upon connecting the conference participant to the reservationless conference comprises invoking the reservationless conference on connecting the chairperson to the reservationless conference.

6. The method of claim 4, wherein:
the chairperson is a dial-out participant.

7. The method of claim 1, further comprising
indicating whether one or more of the plurality of conference participants is required to authenticate before joining the reservationless conference; and
authenticating participants required to authenticate upon receiving a request by one or more such participants to connect to the reservationless conference or upon establishing a dial-out connection with one or more such participants.

8. A system comprising:
a processor; and
a storage device, coupled to the processor, on which are stored instructions, comprising instructions that when executed cause the processor to:
indicate whether each of a plurality of conference participants is a dial-in participant or a dial-out participant;
connect a conference participant of the plurality of conference participants to a reservationless conference, comprising instructions that when executed cause the processor to either:
receive a dial-in from the conference participant; or
establish a dial-out with the conference participant;
allocate resources for the reservationless conference upon connecting the conference participant to the reservationless conference; and
invoke the reservationless conference upon connecting the conference participant to the reservationless conference.

9. The system of claim 8, wherein the instructions further comprise instructions that when executed cause the processor to:
message dial-in participants to request the dial-in participants to connect to the reservationless conference.

10. The system of claim 9, wherein the instructions further comprise instructions that when executed cause the processor to:
message dial-out participants with at least one failed request to connect to the reservationless conference to request the dial-out participants to connect to the reservationless conference.

11. The system of claim 8, wherein the instructions further comprise instructions that when executed cause the processor to
identify a dial-out conference participant of the plurality of conference participants as a chairperson;
invoke the reservationless conference on connecting the chairperson to the reservationless conference; and
delay connection of one or more participants to the reservationless conference until the chairperson is connected.

12. The system of claim 8, wherein the instructions further comprise instructions that when executed cause the processor to:
display a graphical user interface allowing an indication of whether one or more of the plurality of conference participants is required to authenticate before joining the reservationless conference; and
authenticate participants required to authenticate upon receiving a request by one or more such participants to connect to the reservationless conference or upon establishing a dial-out connection with one or more such participants.

13. The system of claim 12, wherein participants are authenticated to the reservationless conference using one or more of passcode authentication and biometric authentication.

14. A method comprising:
indicating whether each of a plurality of conference participants is a dial-in participant or a dial-out participant, and
indicating whether one or more of the plurality of conference participants is a chairperson for a reservationless conference;
connecting a conference participant of the plurality of conference participants to the reservationless conference, comprising one of:
receiving a dial-in from at least one conference participant; and
establishing a dial-out with at least one conference participant;
delaying one or more connections to the reservationless conference by one or more participants until the reservationless conference is invoked;
invoking the reservationless conference upon connecting a chairperson to the reservationless conference; and
allocating resources for connecting participants to the reservationless conference, the resources allocated depending upon participants connected.

15. The method of claim 14, further comprising:
sending a message to dial-in participants to request the participants to connect to the reservationless conference, comprising at least one of dial-in information or required authentication information.

16. The method of claim 14, further comprising:
contacting dial-out participants with at least one failed request to connect to the reservationless conference to request the participants to connect to the reservationless conference.

17. The method of claim 14, further comprising:
authenticating participants to the reservationless conference upon receiving one or more requests to connect to the reservationless conference by one or more participants, using one or more of passcode authentication and biometric authentication.

18. A system, comprising:
a processor; and
a storage device, on which are stored instructions, comprising instructions that when executed cause the processor to:
   indicate whether each of a plurality of conference participants is a dial-in participant or a dial-out participant, wherein at least one participant of the plurality of conference participants is located remotely;
   indicate whether one or more of the plurality of conference participants is a chairperson for a reservationless conference;
   establish a dial-in or dial-out connection to the reservationless conference with a conference participant of the plurality of conference participants;
   invoke the reservationless conference and allocate resources for the reservationless conference responsive to a determination that a chairperson has connected to the reservationless conference; and
   delay connection of participants to the reservationless conference responsive to a determination that no chairperson has connected to the reservationless conference.

19. The system of claim 18, wherein the instructions further comprise instructions that when executed cause the processor to:
   send a message to dial-in participants to connect to the reservationless conference, wherein the message includes at least one of dial-in information and required authentication information; and
   send a message to dial-out participants with at least one failed request to connect to the reservationless conference to request the participants to connect to the reservationless conference.

20. The system of claim 18, wherein the instructions further comprise instructions that when executed cause the processor to:
   authenticate participants to the reservationless conference using one or more of passcode authentication and biometric authentication.

\* \* \* \* \*